A. W. WILT.
AUTOMOBILE WHEEL.
APPLICATION FILED JAN. 12, 1911.
999,689.
Patented Aug. 1, 1911.
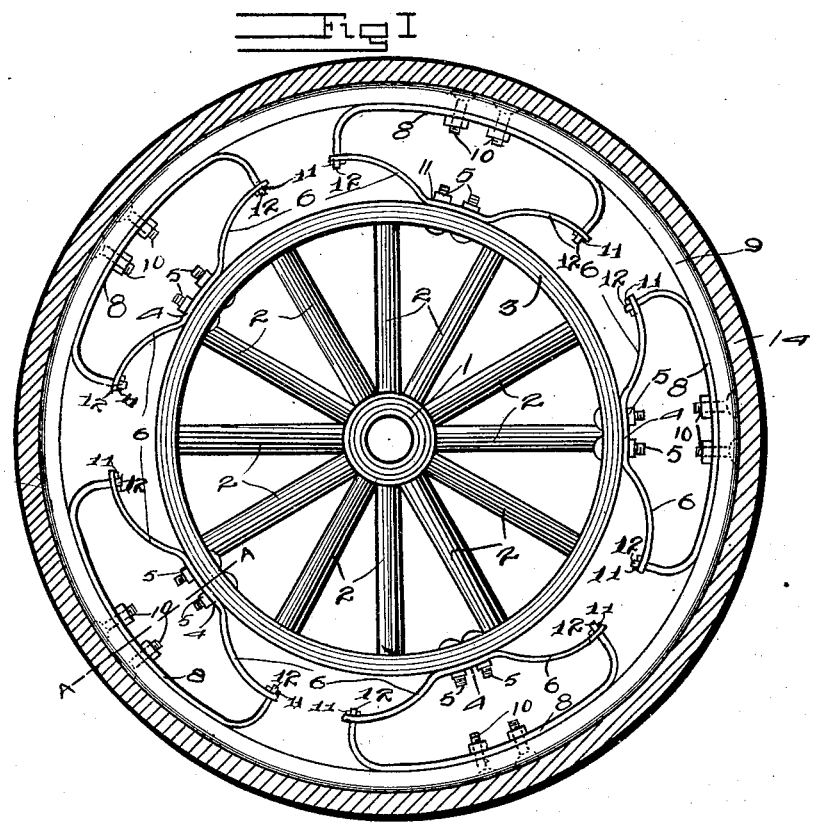
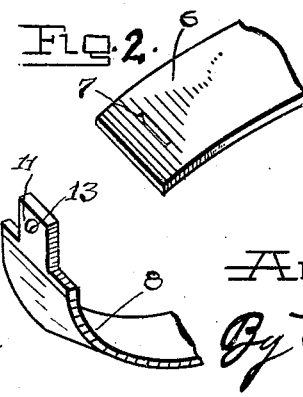
WITNESSES
Howard F. Costello
Ross J. Woodward
INVENTOR
Andrew W. Wilt.
By E. E. Vrooman
his Attorney,

UNITED STATES PATENT OFFICE.

ANDREW W. WILT, OF PORT CHESTER, NEW YORK.

AUTOMOBILE-WHEEL.

999,689.

Specification of Letters Patent.   Patented Aug. 1, 1911.

Application filed January 12, 1911. Serial No. 602,323.

*To all whom it may concern:*

Be it known that I, ANDREW W. WILT, a citizen of the United States, residing at Port Chester, in the county of Westchester and State of New York, have invented certain new and useful Improvements in Automobile-Wheels, of which the following is a specification, reference being had therein to the accompanying drawing.

This invention relates to vehicle wheels and the principal object of the same is to produce a novel type of spring which will take up any shocks caused by going over rough roads or over obstructions in the road.

The invention is illustrated in the accompanying drawing, wherein—

Figure 1 is a side elevation of the wheel. Fig. 2 is an enlarged fragmentary view of the ends of one of the springs.

Referring to the accompanying drawings by numerals it will be seen that the improved wheel comprises a hub 1 which carries the spokes 2 which have the rim 3 surrounding their outer ends and secured thereto. A number of springs are secured to the rim 3 and are preferably arranged thereon so that each of the springs is positioned directly opposite a space between two of the springs. By means of this construction, there is always provided a spring in alinement with the point of greatest strain.

The springs comprise an inner member which has a central portion 4 rigidly secured to the rim 3 by the bolts 5 or any other suitable means. This portion 4 of the spring conforms to the contour of the rim 3 so that the spring is rigidly secured in place. The outer portions 6 are outwardly bowed and have their end portions provided with transverse slots 7. The outer member 8 of the spring is secured to a second rim 9 by any suitable means, such for instance as the bolts 10 the heads of which are countersunk. The major portion of the spring member 8 conforms to the contour of the inner face of the rim 9 and lies closely in contact therewith. The outer portions 11 are bowed inwardly and terminate in reduced portions 11 which pass through the slots 7 and are secured in place by means of pins 12 passing through openings 13. By having the spring constructed in this manner, there is provided an inner section which has its outer portions bowed toward the rim 3 so that the spring will be able to resist the greater amount of weight. The outer member of the spring has its outer ends bowed in the same direction as the outer portions of the inner member, and the spring is thus given a greater amount of resisting power.

What I claim is:—

A wheel of the character described comprising an inner rim, an outer rim, springs holding said rims in spaced relation, each of said springs comprising an inner member, and an outer member, one of said spring members provided with a transverse slot adjacent each end, the other of said spring members provided with a lug at each end passing through said slots, means for retaining said lugs within said slots, a hub, and spokes connecting said hub with said inner rim.

In testimony whereof I hereunto affix my signature in presence of witnesses.

ANDREW W. WILT.

Witnesses:
MARGARET B. KELEHER,
JOHN W. MCCARTY,
THOMAS T. CONNOLLY.

Copies of this patent may be obtained for five cents each, by addressing the "Commissioner of Patents, Washington, D. C."